US007548488B2

(12) United States Patent
Horak et al.

(10) Patent No.: US 7,548,488 B2
(45) Date of Patent: Jun. 16, 2009

(54) AIRBORNE ACOUSTIC SENSOR ARRAY

(75) Inventors: Dan T. Horak, Ellicott City, MD (US);
Richard A. Burne, Ellicott City, MD (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/135,931

(22) Filed: May 23, 2005

(65) Prior Publication Data
US 2006/0262646 A1 Nov. 23, 2006

(51) Int. Cl.
*G01S 3/80* (2006.01)
(52) U.S. Cl. ...................................... 367/120
(58) Field of Classification Search ................ 367/120, 367/118; 244/1 R; 701/3
See application file for complete search history.

(56) References Cited

U.S. PATENT DOCUMENTS

| 5,575,438 | A | | 11/1996 | McGonigle et al. ........... 244/13 |
| 5,831,936 | A | * | 11/1998 | Zlotnick et al. ............. 367/124 |
| 5,951,346 | A | | 9/1999 | Woodall, Jr. .................... 441/7 |
| 6,380,889 | B1 | | 4/2002 | Herrmann et al. ...... 342/357.09 |
| 6,584,879 | B2 | | 7/2003 | Gorman ...................... 89/1.11 |
| 6,588,701 | B2 | * | 7/2003 | Yavnai ..................... 244/23 A |
| 6,614,723 | B2 | | 9/2003 | Pearce et al. ................ 367/154 |
| 2006/0262646 | A1 | * | 11/2006 | Horak et al. ................ 367/120 |
| 2008/0078865 | A1 | * | 4/2008 | Burne ........................ 244/1 R |

FOREIGN PATENT DOCUMENTS

| DE | 42 28 539 A1 | 3/1994 |
| DE | 195 36 756 C1 | 5/1996 |
| EP | 1 193 168 A2 | 4/2002 |
| EP | 1 588 886 A | 10/2005 |
| GB | 2 097 121 A | 10/1982 |

OTHER PUBLICATIONS

International Search Report for PCT/US2006/019995 dated Nov. 16, 2006.
Heberley, Jeffrey "Advanced Acoustic Sensor Technologies," TACOM, NDIA Symposium, Session III Advanced Technologies Jun. 20, 2001.
Wise Lab, "Warning & Indicator Systems," Wise Lab, http://www.caip.rutgers.edu/wiselab.
Textron Systems Next Generation Ground Combat Systems, Jul. 8, 2002.

* cited by examiner

*Primary Examiner*—Dan Pihulic
(74) *Attorney, Agent, or Firm*—Black Lowe & Graham PLLC

(57) ABSTRACT

Embodiments for determining the bearings to targets from a remote location are disclosed. The apparatus consists of an array of acoustic sensors that is capable of autonomous flight. The array may be large in diameter, approximately one meter or greater. The apparatus is capable of navigating its flight to arrive at a predetermined location, measuring acoustic sound waves emitted by targets both during flight and after landing. The apparatus may then calculate the bearings to the targets and transmit this information to a remote location.

20 Claims, 5 Drawing Sheets

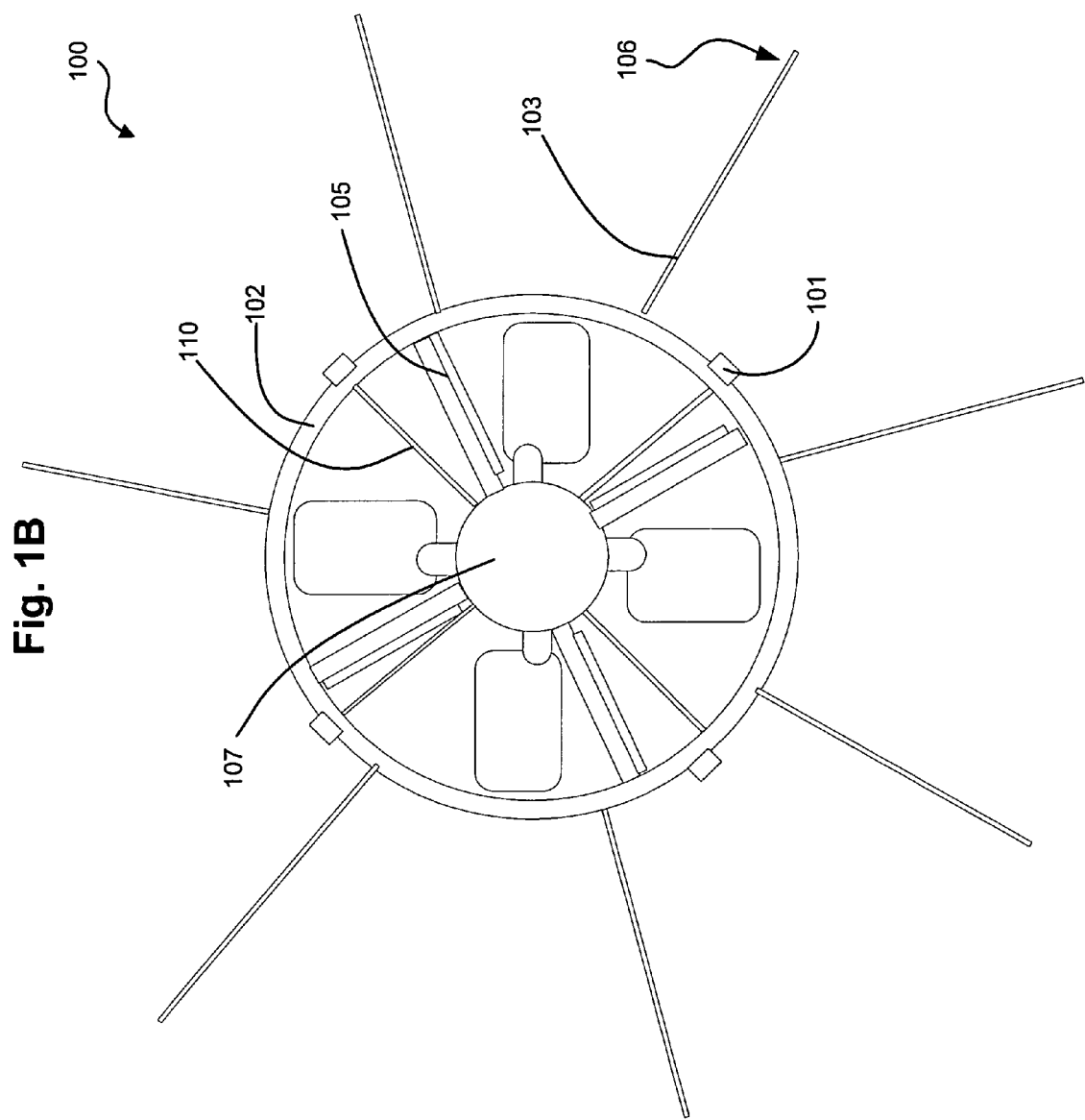

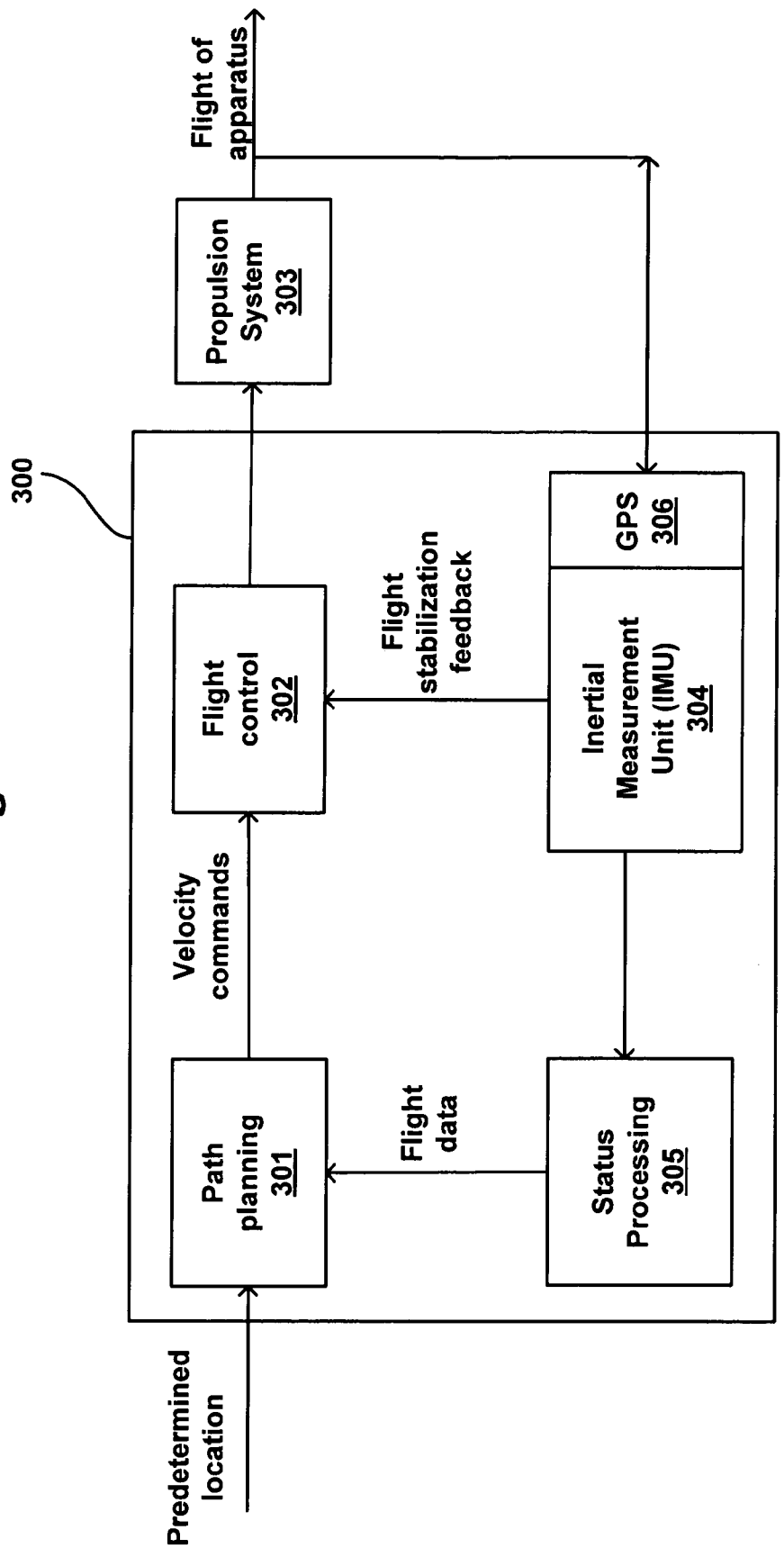

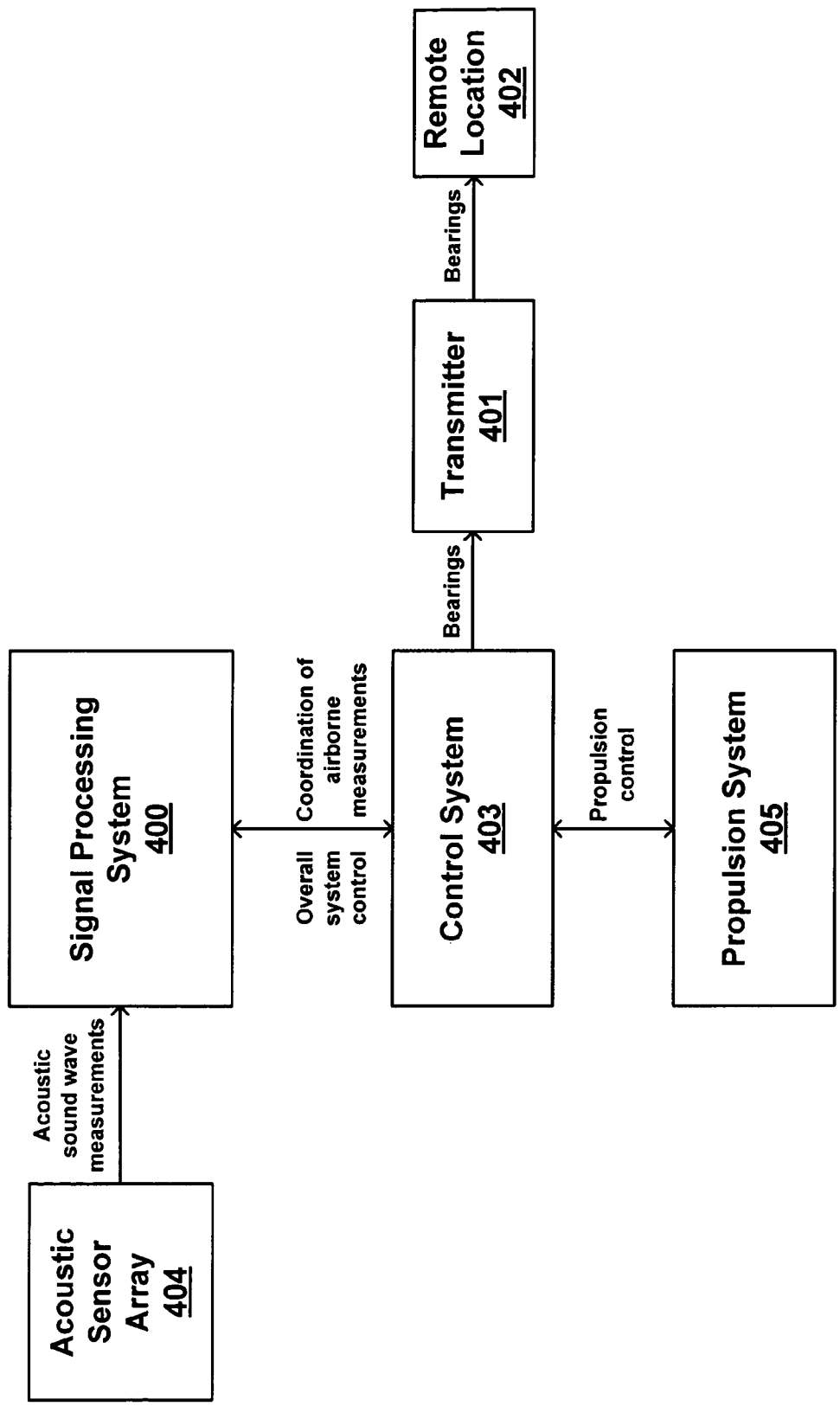

AIRBORNE ACOUSTIC SENSOR ARRAY

BACKGROUND

Acoustic sensor arrays protect soldiers by allowing for long range detection, tracking, and classification of enemy vehicles. An acoustic sensor array may consist of several sensors arranged in a circle which pick up acoustic data and use it to calculate the bearing angles to one or more targets. If two or more arrays are available, geometric triangulation may be used to pinpoint the location of the targets, and transmit this to a remote location via a transmitter. Currently, larger arrays must be manually installed by soldiers, while smaller arrays may be deployed by aircraft or artillery.

Smaller arrays, such as those where the sensors are arranged on a circle with a diameter of approximately fifteen centimeters or less, do not require installation by soldiers. However, they measure the bearing angle with an error having a standard deviation greater than four degrees. The magnitude of this error means the arrays must be placed close to the target to be accurate and effective.

Larger arrays, such as those where the sensors are arranged on a circle with diameter of approximately one meter or more, achieve greater accuracy because their size is closer to the acoustic wavelengths they are measuring, resulting in more accurate beamforming methods which are used to determine the bearing angles. These arrays can measure the bearing angle to a vehicular target 500 meters away with an error that has a standard deviation of less than one degree. Larger arrays, however, typically cannot be deployed from aircraft or by artillery. Therefore, they must be installed manually by soldiers, which jeopardizes the soldiers' safety.

While smaller arrays that can be deployed by aircraft or by artillery partially address the problem of protecting soldiers, they are an incomplete solution because their size limits their accuracy. In addition, achieving accuracy in the placement of an array is difficult when deploying them this way.

Therefore, it would be desirable to have a relatively large, airborne acoustic sensor array that does not require manual installation by soldiers. Such an array would be capable of autonomous deployment, lessening the endangerment of soldiers, while providing the greater accuracy of a larger array.

SUMMARY OF THE INVENTION

An apparatus and method for determining the bearing directions to one or more targets from a remote location is disclosed. The apparatus comprises an airborne array, capable of navigating its flight to reach a predetermined location. The array may include several acoustic sensors, capable of measuring acoustic sound waves emitted by the targets.

The apparatus may calculate the bearings to the targets and transmit this information to the remote location. The array detects acoustic sound waves emitted by the targets. A signal processing system then uses the acoustic sound waves to determine the bearings to the targets. A transmitter then sends the bearings to the remote location. In some embodiments the apparatus may be capable of determining the bearings to the targets both during flight and after landing at the predetermined location.

By allowing for remote deployment of the sensor array, the apparatus eliminates the need for soldiers to deploy arrays manually. In addition, the apparatus may comprise larger arrays, capable of greater accuracy in calculating the bearings to targets. Therefore, the present invention allows for better accuracy in determining the bearings to targets and eliminates the need for manual installation, protecting soldiers.

BRIEF DESCRIPTION OF THE DRAWINGS

Exemplary embodiments of the present invention are described herein with reference to the drawings in which:

FIG. 3 is a block diagram showing the communication between the control system and the propulsion system when the sensor array is airborne.

FIG. 4 is a block diagram illustrating functions that may be performed by and communications that may take place between various components of an embodiment of an airborne acoustic sensor array.

DETAILED DESCRIPTION

Figure 1A:
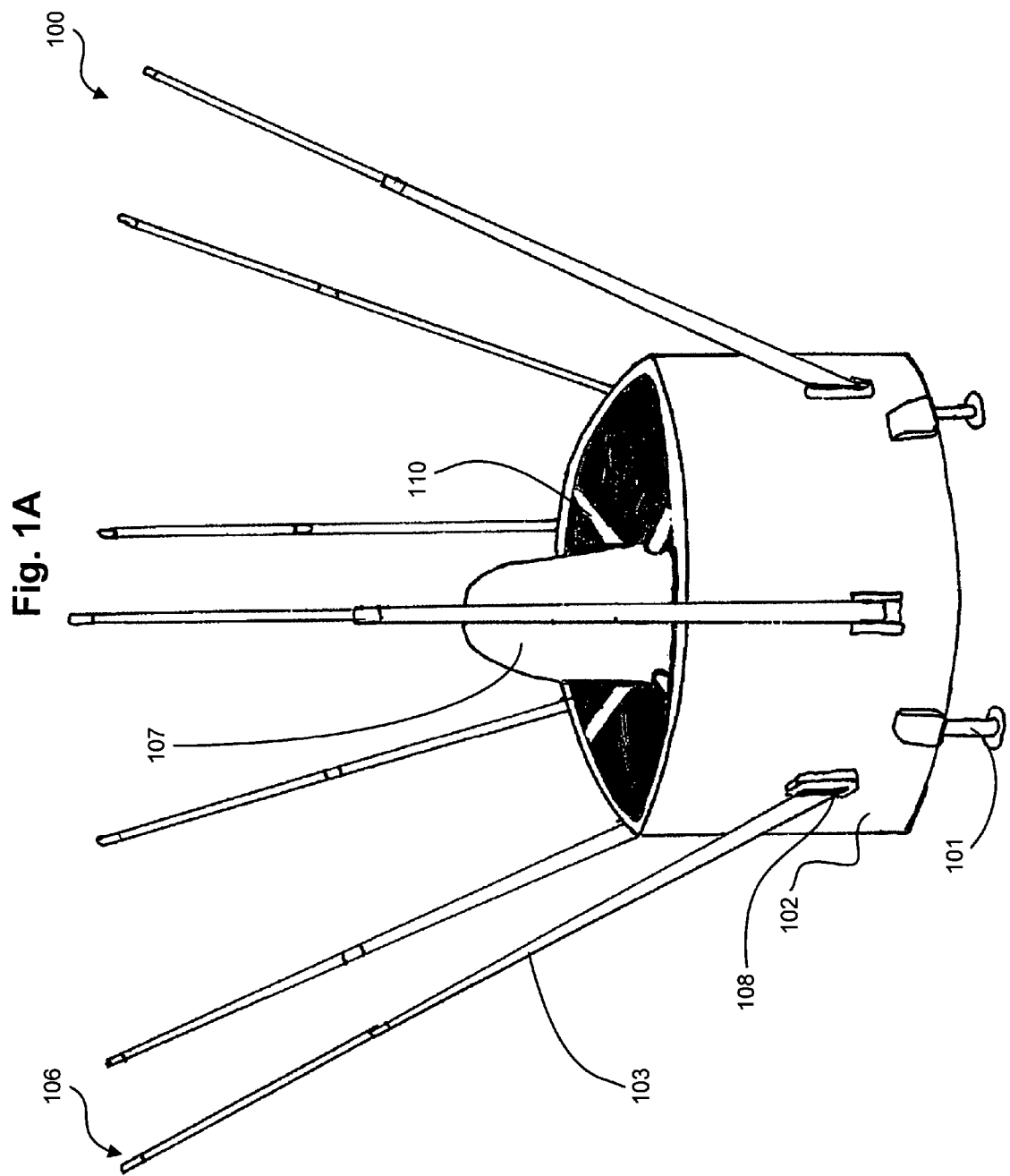
FIG. 1 is an illustration of one embodiment of present invention, showing an apparatus for determining the bearings to targets from a remote location.

FIGS. 1A and 1B are perspective and plan views showing an apparatus 100 for determining the bearings to one or more targets, according to one embodiment of the present invention. The apparatus is operable to fly to a predetermined location and detect acoustic sound waves emitted by the target. The acoustic sensors 106 may detect the acoustic sound waves both during flight and after landing at the predetermined location. With the detected acoustic sound waves, a signal processing system, such as that described with reference to FIG. 4, can determine the bearing to the target and transmit the bearing to a remote location, such as a military base camp or artillery station.

The apparatus 100 has a propulsion system to enable flight. The propulsion system may consist of a duct 102, an impeller 104 (FIG. 1B), vanes 105, and an engine. In a preferred embodiment the engine is contained within the central housing unit 107. To provide flight, the impeller 104 rotates, forcing air downward through the duct 102. The vanes 105 are positionable to control the flow of air through the duct 102, thereby controlling the direction of flight. The propulsion system is operated by the control system. A series of spokes 110 attaches the central housing unit 107 (and enclosed engine) to the duct 102.

In a preferred embodiment, a plurality of acoustic sensors 106 is arranged in a circular array 111, with each acoustic sensor 106 being installed on an arm 103 and positionable using an actuator 108 (FIG. 1A). It is preferable that the arms 103 be positionable, as positioning the arms approximately perpendicular to the ground reduces the danger of collision with trees and buildings when the array is flying. After landing, the arms may be positioned approximately parallel to the ground which increases the size of the sensor array and improves bearing determination accuracy. The actuators 108 are attached to the duct 102. The duct may measure from approximately 30 centimeters in diameter for smaller arrays to over one meter in diameter for larger arrays. Pedestals 101 provide support for the apparatus after landing.

Figure 2:
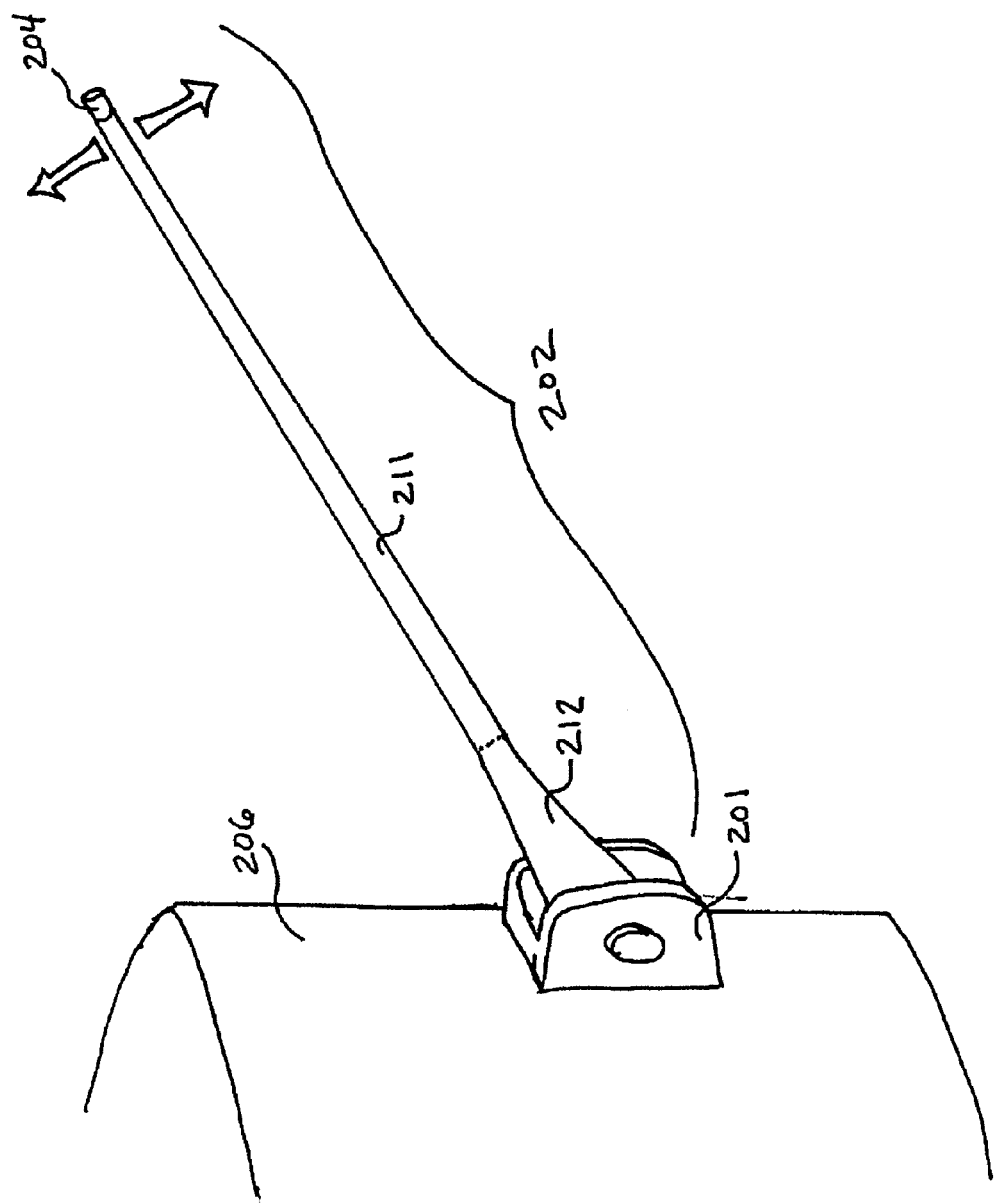
FIG. 2 is a detailed illustration of a single arm and sensor.

FIG. 2 shows in detail a possible configuration for a single acoustic sensor 204, an arm 202, and an actuator 201 attached to a portion 206 of the duct 102. The arms 202 may consist of two sections, a tapered section 212 and a substantially straight section 211. The arms may be made with circular hollow cross sections to maximize their rigidity-to-weight ratio. This is to prevent vibration of the arms when the sensors are detecting acoustic sound waves and at the same time to keep their weight low to make flying easier. Possible fabrication materials for the arms include fiberglass and aluminum, for example.

FIG. 3 shows possible communications between the control system 300 and the propulsion system 303 in a preferred embodiment of the invention. The control system 300 may send flight commands to the propulsion system 303, which regulates fan speed and vane angles, thereby controlling the velocity and direction of flight.

A flight control block 302 of the control system 300 generates flight commands using velocity commands and flight stabilization feedback. The flight stabilization feedback stabilizes the apparatus. Like a helicopter, the apparatus likely would be dynamically unstable without a feedback signal. The velocity commands indicate the velocities that would bring the sensor to a specified location along a desired trajectory in a given amount of time. The velocity commands are generated by a path planning block 301.

The path planning block 301 designs a path from a first location to a second location, such as a predetermined landing location, by comparing current flight data to the second location. It then outputs velocity commands in accordance with the path, as described above.

The current flight data is generated by a status processing block 305 in the control system 300. The status processing block 305 converts raw flight measurements taken by an Inertial Measurement Unit (IMU) 304 and/or a GPS unit 306 into the flight data used by the path planning block 301. The measurements taken by the IMU 304 and GPS 306 unit may also be used to create the flight stabilization feedback used by the flight control block 302. A compass (not shown), such as an electronic compass comprised of two or more magnetic sensors, also may be included to provide additional data for navigating and determining bearings.

FIG. 4 is a block diagram illustrating functions and communications that may take place in an embodiment of an airborne acoustic sensor array. The airborne acoustic sensor array includes a signal processing system 400, a transmitter 401, a control system 403, an array 404 of acoustic sensors, and a propulsion system 405. The signal processing system 400 may use sound wave measurements taken by the array 404 to determine the bearings to one or more targets (not shown), using known beamforming techniques for conventionally deployed acoustic sensor arrays. So that bearings may be determined while the apparatus 450 is airborne, the signal processing system 400 may be in communication with the control system 403. Specifically, the signal processing system 400 and the control system 403 may coordinate their operations so that the signal processing system 400 will be able to compute bearings from acoustic sound waves of targets, largely without interference from sound waves emitted by the propulsion system 405. The control system 403 may also transmit bearings determined by the signal processing system 400 to a remote location 402 via the transmitter 401. Transmission of bearing information (which may include other information, such as GPS coordinates, altitude, etc.) may be made while the apparatus 450 is in flight and/or after the apparatus 450 has landed.

Increasing the diameter of the array 404 increases the accuracy of the beamforming methods. Thus, an array 404 of greater diameter is beneficial to determine the bearings to the targets more accurately. In some embodiments, the array 404 may be unfolded prior to or during flight, allowing for more accurate measurements during the flight. In other embodiments, flight may not be possible with the array 404 unfolded. The folding arms make the apparatus more compact for flight. As a result, the lift provided by the propulsion system 405 is suitable for larger arrays 404 than might otherwise be possible. In embodiments in which flight occurs with the arms compactly folded for flight, the weight of the apparatus and/or the force generated by the impact with the ground may be used to unfold the arms so that they are positioned at an appropriate angle relative to the ground. Alternatively, the arms could be opened using a powered method, but the increased weight due to the powered actuators would make flight more difficult.

To enable measurements by the array 404 during flight, the propulsion system 405 may include both an internal combustion unit ("ICU") and an electric motor. This allows the propulsion system 405 to be capable of momentary electrical propulsion, briefly switching to an electrical source of power, which powers the apparatus without the acoustic sound waves that the engine emits. Acoustic sound waves emitted by the engine can interfere with measurements taken by the acoustic array 404. By providing quiet power, a propulsion system capable of momentary electrical operation enables more accurate measurements during flight.

Specifically, the propulsion system may consist of an ICU and an electric motor powered by a supercapacitor. When the ICU powers the apparatus, a DC generator charges the supercapacitor. Periodically the ICU shuts off and the apparatus is powered by the motor and the supercapacitor for several seconds. While the motor and the supercapacitor power the apparatus, the apparatus is quiet, making it possible for the apparatus to take acoustic measurements. Presently existing supercapacitors do not provide enough energy to continually power the apparatus during flight, making the ICU necessary to enable continual flight. However, future supercapacitors may be able to provide more energy, allowing for continuous measurements during flight.

The signal processing system 400 may also employ a software method for reducing the interference due to engine sound and impeller sound. The control system 403 communicates the rotational speed of the propulsion system 405 to the signal processing system 400. The signal processing system 400 computes from this rotational speed the firing frequency of the ICU and the impeller-blade-passage frequency. During computation of the bearings to targets, the signal processing system 400 excludes from consideration these two interfering frequencies, thus concentrating only on the sound frequencies that are emitted by the targets. This process increases the accuracy of the computed bearings to targets.

The apparatus may also be designed so that the rotational speed of the impeller is higher than the sound frequencies emitted by targets. Thus the interfering sounds emitted by the propulsion system 405 will be at higher frequencies than the sound emitted by the targets and interference will be reduced. This design feature increases the accuracy of the computed bearings to targets.

The apparatus may also be used so that bearing measurements in flight are performed when its sensor arms are fully unfolded and are perpendicular to the symmetry axis of the duct. This places the sensors far from the air flow induced by the impeller and reduces interference between the air flow and sounds emitted by targets. This usage mode increases the accuracy of the computed bearings to targets.

In an alternative embodiment, the array 404 may be removably attached to the rest of the apparatus. For example, the array 404 could be attached to a cylindrical shell surrounding the duct. After flying to the predetermined location, a release mechanism may release the shell, leaving the array 404 at the predetermined location, so it may continue transmitting the bearings to targets to the remote location, while the apparatus flies back to the remote location. At the remote location another shell may be attached to the apparatus, so that this process may be repeated.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as limitation. The actual scope of the invention is intended to be defined in the following appended claims.

We claim:

1. An apparatus for determining bearing angles to a target from a remote location, comprising:
   an array having a plurality of acoustic sensors capable of detecting acoustic sound waves;
   a signal processing system that computes the bearing angles to targets based on the detected acoustic sound waves;
   a propulsion system providing flight for the apparatus; and
   a control system in communication with the propulsion system and the signal processing system, wherein the control system operates the propulsion system and provides for communication between the apparatus and a remote location.

2. The apparatus of claim 1, wherein the propulsion system further comprises:
   a cylindrical duct;
   an impeller providing thrust by pushing air downward through duct;
   a plurality of vanes positionable to regulate the flow of air through the duct; thereby controlling direction of the flight;
   an engine; and
   a central housing unit containing the engine and the control system.

3. The apparatus of claim 1 wherein the array further comprises a plurality of actuators and a plurality of arms and wherein the plurality of arms is positionable using the plurality of actuators, thereby enabling the array to be placed in a plurality of specific positions.

4. The apparatus of claim 3 wherein the plurality of actuators attaches the array to the duct.

5. The apparatus of claim 1 wherein the plurality of acoustic sensors comprises a plurality of microphones capable of detecting the acoustic sound waves.

6. The apparatus of claim 3 wherein the array is a circular array comprising individual acoustic sensors positioned at the ends of each of the arms in the plurality of arms.

7. The apparatus of claim 6 wherein the circular array is approximately 30 centimeters in diameter.

8. The apparatus of claim 6 wherein the circular array is at least 1 meter in diameter.

9. The apparatus of claim 2 wherein the array is positioned outside of a flow field of air created by the air being pushed downward through the duct.

10. The apparatus in claim 2, wherein the engine comprises an internal combustion unit and an electric motor powered by a supercapacitor, and wherein the supercapacitor periodically powers the apparatus thereby eliminating engine sound created when the internal combustion unit powers the apparatus.

11. The apparatus of claim 10 wherein the control system monitors a rotational frequency associated with the impeller to enable interfering engine and impeller sound to be filtered from the acoustic sound waves detected by the acoustic sensors.

12. The apparatus of claim 2 wherein the impeller rotates at frequency higher than a typical highest frequency of the acoustic sound waves associated with the target.

13. The apparatus of claim 1, wherein the propulsion system further comprises:
    a cylindrical duct;
    an impeller providing thrust by pushing air downward through the duct;
    a plurality of vanes positionable to regulate the flow of air through the duct, thereby controlling direction of the flight;
    an engine; and
    a central housing unit in which the engine is contained.

14. The apparatus of claim 13, wherein the plurality of acoustic sensors is removably attached to the duct, further comprising a release mechanism for detaching the plurality of acoustic sensors from the duct to leave the plurality of acoustic sensors at a first location while allowing the apparatus to fly to a second location.

15. A method for determining the bearings to targets from a remote location comprising:
    (a) flying an unmanned apparatus to a desired location, the apparatus comprising a plurality of acoustic sensors;
    (b) landing the apparatus at the desired location;
    (c) measuring acoustic sound waves emitted by targets, using the plurality of acoustic senors;
    (d) estimating the bearings to the targets, using the measurements made by the plurality of acoustic sensors; and
    (e) transmitting the estimation of the bearing to a remote location; wherein the apparatus includes an engine comprising an internal combustion unit and an electric motor powered by a supercapacitor.

16. The method of claim 15, wherein flying the sensor to the desired location further comprises:
    deactivating the internal combustion unit and activating the electric motor;
    measuring acoustic and waves emitted by targets while the electric motor is activated, using the plurality of acoustic sensors;
    estimating the bearings to the targets, using the measurements made by the plurality of acoustic sensors;
    deactivating the electric motor and activating the internal combustion unit; and
    transmitting the estimation of the bearings to a remote location.

17. The method of claim 16, further comprising repeating the method of claim 16 periodically.

18. A method for determining the bearings to targets from a remote location comprising:
    (a) flying an unmanned apparatus to a desired location, the apparatus comprising a plurality of acoustic sensors;
    (b) landing the apparatus at the desired location;
    (c) measuring acoustic sound waves emitted by targets, using the plurality of acoustic sensors;
    (d) estimating the bearing to the targets, using the measurements made by the plurality of acoustic sensors; and
    (e) transmitting the estimation of the bearing to a remote location; wherein the plurality of acoustic sensors are located on sensor arms attached to the apparatus, the method further comprising manually positioning the sensor arms prior to flying the apparatus to the desired location.

19. A method for determining the bearings to targets from a remote location comprising:
    (a) flying an unmanned apparatus to desired location, the apparatus comprising a plurality of acoustic sensors;
    (b) landing the apparatus at the desired location;
    (c) measuring acoustic sound waves emitted by targets, using the plurality of acoustic sensors;

(d) estimating the bearing to the targets, using the measurements made by the plurality of acoustic sensors; and (e) transmitting the estimation of the bearing to a remote location; wherein landing the apparatus at the desired location further comprises detaching the plurality of acoustic sensors from a propulsion system and flying the propulsion system to a second location, thereby leaving the plurality of acoustic sensors in the desired location to continue taking measurements, estimating the bearings to the target, and transmitting the estimation to the remote location.

20. The method of claim 19 wherein the second location is the remote location.

* * * * *

UNITED STATES PATENT AND TRADEMARK OFFICE
CERTIFICATE OF CORRECTION

| | |
|---|---|
| PATENT NO. | : 7,548,488 B2 |
| APPLICATION NO. | : 11/135931 |
| DATED | : June 16, 2009 |
| INVENTOR(S) | : Dan T. Horak et al. |

It is certified that error appears in the above-identified patent and that said Letters Patent is hereby corrected as shown below:

In the Claims

Claim 19, column 7, line 3: says "estimation of the bearing", should say --estimation of the bearings--

Signed and Sealed this
Eleventh Day of March, 2014

Michelle K. Lee
*Deputy Director of the United States Patent and Trademark Office*